June 17, 1941.     G. A. LYON     2,245,928
WHEEL DISK STRUCTURE
Original Filed Jan. 15, 1936

Inventor
GEORGE ALBERT LYON.
by Charles W Hills
Attys.

Patented June 17, 1941

2,245,928

UNITED STATES PATENT OFFICE 2,245,928

WHEEL DISK STRUCTURE

George Albert Lyon, Allenhurst, N. J.

Original application January 15, 1936, Serial No. 59,276. Divided and this application December 21, 1939, Serial No. 310,335

4 Claims. (Cl. 301—37)

This invention relates to a wheel structure, and more particularly to a circular cover member for retaining cooperation with the outer side of a wheel.

The subject matter of the present application has been divided from my copending application Serial No. 59,276, filed January 15, 1936, now Patent No. 2,190,669, issued February 20, 1940, entitled "Wheel disk structure."

An object of this invention is to provide an improved, simple, and relatively light cover member for an automobile wheel.

Another object of this invention is to provide in a wheel structure including a wheel having rim and body parts a novel covering member for cooperation with one of said parts and being reinforced both at its point of retaining cooperation with the wheel and at the point where a pry-off force may be applied to remove the cover member from the wheel.

In accordance with the general features of this invention, there is provided in a wheel structure including rim and body parts a circular cover member for retaining cooperation with one of these parts and comprising a central portion, an outer marginal portion, and an intermediate depressed portion, the depressed portion providing in the cover member a rearwardly extending inclined flange separated by a groove in the outer face of the cover member from the outer marginal portion, and which flange projects in both radial and axial directions away from the central portion.

Another feature of this invention relates to the construction of the retaining flange of the wheel cover member whereby this flange is reinforced at its point of retaining engagement with the wheel.

Still another feature of this invention relates to the reinforcing of the outer marginal portion of the cover member so as to cause this portion to better resist indentations when the end of a pry-off tool is inserted thereunder to eject the cover member from the wheel.

Still another feature of the invention relates to the provision in the cover member of a masking plate for concealing the junction between the central and outer marginal portions of the cover member.

Other objects and features of this invention will more fully appear from the following detailed description taken in conjunction with the accompanying drawing which illustrates a single embodiment thereof, and in which.

As shown on the drawing.

Figure 1:
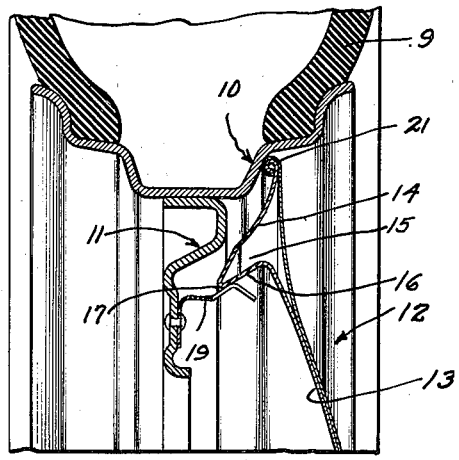
Figure 1 is a fragmentary vertical cross sectional view taken through a wheel structure embodying the features of this invention and showing the manner in which the cover member retainingly cooperates with the wheel.
Figure 2:
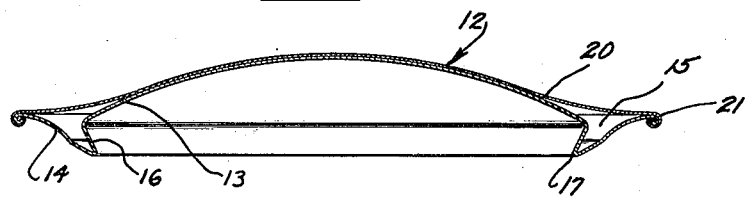
Figure 2 is a cross sectional view taken through a cover member embodying the features of this invention.

The reference character 10 designates generally a drop center tire rim part for accommodating in the usual way a tire 9. Secured to the base flange of this tire rim part 10 is a wheel body part 11, the central portion of which is adapted to be fastened in the usual way by bolts or cap screws to a part on an axle of a vehicle.

Positioned over the outer face of the wheel is a circular ornamental cover member 12 embodying the features of this invention. This cover member 12 is adapted to retainingly cooperate with a plurality of springs 19 secured to the body part 11 of the wheel. These springs may be of any suitable number, such for example as five, and each of them is of a substantially right angular construction as is evident from the illustration shown in Figure 1. These springs have been disclosed in previous patents granted to me and hence do not per se constitute a part of this invention.

The wheel cover member 12, as noted before, is of circular configuration and is preferably made of relatively light sheet material such as will lend itself readily to the application of a high luster finish. For illustration, the cover member 12 may be made of stainless steel sheet metal or of any other suitable metal having the requisite characteristics of lightness and rigidity.

The cover member 12 includes a central bulged or crown portion 13, an outer marginal portion 14, and an intermediate grooved portion 15. The intermediate grooved portion 15 includes an obliquely inclined flange or skirt 16 which extends in both axial and radial directions rearwardly from the outer periphery of the bulged portion 13. This flange 16 is at a reentrant angle to the outer marginal portion 14 and is separated from the outer marginal portion 14 by a groove as is clearly shown in the drawing.

The innermost extremity of the flange 16 is turned, as indicated at 17, so as to provide a turned edge for engagement with the free ends of the retaining spring elements 19. This feature is advantageous in that it provides the cover member with reinforcement at its point of application to the retaining means on the wheel. Thus, the retaining skirt or flange of the cover member is enabled to better resist indentations from the pressure of the spring retaining elements 19.

In order to conceal the groove at the intermediate portion 15, I have provided the cover member with a masking plate of suitable light metal designated by the reference character 20. This masking plate has at its center the same general contour as the bulged portion 13 and has its peripheral portion lock seamed to the edge of the outer marginal portion 14 of the cover member so that the masking plate is firmly attached to the main body of the cover member.

Figure 3:
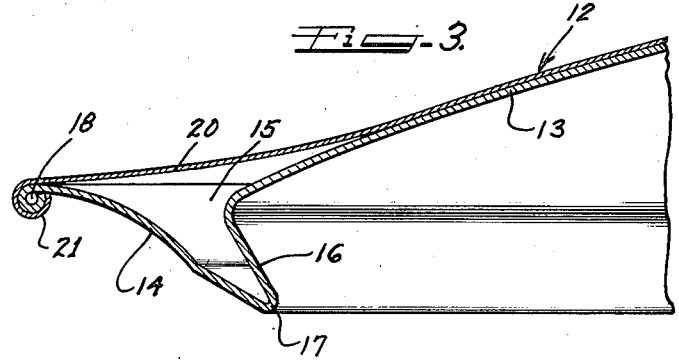
Figure 3 is an enlarged fragmentary sectional view corresponding to one portion of Figure 2 and illustrating clearly the construction of the retaining flange of the cover member.

As best shown in Figure 3, the fastening for the masking plate 20 is provided by curling the outer edge 21 of the masking plate around a curled or turned edge 18 of the outer marginal portion 14 of the cover member. Thus, the outer periphery of the cover member is greatly reinforced by the multiple thicknesses of metal at said edges 18 and 21, and as a consequence the cover member is better enabled to resist indentation from the application of a pry-off force to the outer periphery of the cover member. That is to say, in removing the cover member from the wheel it is the practice to insert behind its outer edge the end of a blunt tool such as a screwdriver and to then twist or exert a force upon the screwdriver so as to forcibly eject the cover member from retaining cooperation with the spring elements 19. This force is resisted by the reinforced outer edge of the cover member.

It will be appreciated that by reason of the angle at which the flange 16 extends relative to the cover member it is enabled to be disposed in a position for ready application to the retaining elements 19.

It will, of course, be understood that various details of construction may be varied through a wide range without departing from the principles of this invention, and it is, therefore, not the purpose to limit the patent granted hereon otherwise than necessitated by the scope of the appended claims.

I claim as my invention:

1. As an article of manufacture, a circular wheel covering member made of sheet metal having a central bulged portion, an outer marginal portion, and an intermediate grooved portion connecting said bulged and marginal portions with the groove of said grooved portion being of substantially V-shaped cross section and separating said bulged and marginal portions, said grooved portion defining a rearwardly obliquely inclined flange for retaining snap-on cooperation with a wheel, and said flange extending rearwardly axially and radially inwardly so that its rearmost extremity is disposed directly behind said bulged portion.

2. As an article of manufacture, a circular wheel covering member made of sheet metal having a central bulged portion, an outer marginal portion, an intermediate grooved portion connecting said bulged and marginal portions, said grooved portion defining a rearwardly obliquely inclined flange for retaining snap-on cooperation with a wheel, and said flange extending axially rearwardly so that its rearmost extremity is disposed directly behind said bulged portion, and a masking plate disposed over the outer face of and attached to said member to conceal the groove in said intermediate portion.

3. As an article of manufacture, a circular wheel covering member made of sheet metal having a central bulged portion, an outer marginal portion, an intermediate grooved portion connecting said bulged and marginal portions, said grooved portion defining a rearwardly obliquely inclined flange for retaining snap-on cooperation with a wheel, and said flange extending axially rearwardly so that its rearmost extremity is disposed directly behind said bulged portion, and a masking plate disposed over the outer face of and attached to said member to conceal the groove in said intermediate portion, said plate having its outer edge lock seamed to the edge of said marginal portion by nested curls on said two edges whereby to provide said member with reenforcement at the point of the application of a pry-off force.

4. As an article of manufacture, a circular wheel covering member made of sheet metal having a central bulged portion, an outer marginal portion, an intermediate grooved portion connecting said bulged and marginal portions, said grooved portion defining a rearwardly obliquely inclined flange for retaining snap-on cooperation with a wheel, and said flange extending axially rearwardly so that its rearmost extremity is disposed directly behind said bulged portion, and a masking plate disposed over the outer face of said member and secured thereto for concealing the junction between said central and outer marginal portions.

GEORGE ALBERT LYON.